(12) United States Patent
Grigoriu et al.

(10) Patent No.: US 7,779,353 B2
(45) Date of Patent: Aug. 17, 2010

(54) ERROR CHECKING WEB DOCUMENTS

(75) Inventors: Victor Grigoriu, Bellevue, WA (US); William James Griffin, Sammamish, WA (US); Shiu-Kai Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/437,259

(22) Filed: May 19, 2006

(65) Prior Publication Data

US 2007/0271510 A1   Nov. 22, 2007

(51) Int. Cl.
*G06F 17/21*   (2006.01)
(52) U.S. Cl. .................. 715/255; 715/243; 715/254; 715/256; 715/257
(58) Field of Classification Search .......... 715/256, 715/257, 243, 254, 255
See application file for complete search history.

(56) References Cited

U.S. PATENT DOCUMENTS

| | | | | |
|---|---|---|---|---|
| 5,576,955 | A * | 11/1996 | Newbold et al. | 715/217 |
| 5,787,451 | A | 7/1998 | Mogilevsky | 715/533 |
| 6,026,416 | A * | 2/2000 | Kanerva et al. | 715/208 |
| 6,044,387 | A * | 3/2000 | Angiulo et al. | 715/257 |
| 6,601,059 | B1 | 7/2003 | Fries | 707/3 |
| 2002/0078106 | A1 | 6/2002 | Carew et al. | 707/533 |
| 2003/0145285 | A1 | 7/2003 | Miyahira et al. | 715/533 |
| 2003/0226131 | A1 | 12/2003 | Li | 717/110 |
| 2003/0237055 | A1 * | 12/2003 | Lange et al. | 715/530 |
| 2004/0268235 | A1 * | 12/2004 | Wason | 715/513 |
| 2005/0125217 | A1 | 6/2005 | Mazor | 704/1 |
| 2005/0149867 | A1 | 7/2005 | Freelander et al. | 715/533 |
| 2005/0223326 | A1 | 10/2005 | Chang et al. | 715/533 |
| 2005/0235031 | A1 * | 10/2005 | Schneider et al. | 709/203 |
| 2005/0283726 | A1 * | 12/2005 | Lunati | 715/533 |

OTHER PUBLICATIONS

Gupta, Kaiser, Grimm, Chiang, Starren, Automating Content Extraction of HTML Document, 2004 Kluwer Academic Publishers. Printed in the Netherlands, http://www.psl.cs.columbia.edu/crunch/WWWJ.pdf.*
"The Newsletter of the CTI Centre for Chemistry," Jan. 1997, ISSN 0964-0525. http://www.liv.ac.uk/citchem/cache15.html#htmled.
Bell, David J.; Barnes, Jeannett; Pilachowski, Caty; "The NOAO Web-Based Observing Proposal System," *Astronomical Data Analysis Software and Systems, VII, ASP Conference Series*, vol. 145, 1998, p. 288-291. http://www.adass.org/adass/proceedings/adass97/reprints/belld.pdf.
Raman, T.V., "Emacspeak—A Speech Interface," Cambridge Research Lab, Digital Equipment Corp. http://delivery.acm.org/10.1145/240000/238405/p66-raman.pdf?key1=238405&key2=8313765311&coll-GUIDE&dl=GUIDE*CFID=60876155&CFTOKEN=96666757.

* cited by examiner

*Primary Examiner*—Joshua D Campbell
*Assistant Examiner*—Christopher Bryant
(74) *Attorney, Agent, or Firm*—Merchant & Gould P.C.

(57) ABSTRACT

Error checking for web documents may be provided. Text errors within a web page are identified by determining text to be error checked within content used in generating a web page and by determining where the text is located within the web page. The text is sent to an error checking module, and errors are displayed to a user.

13 Claims, 4 Drawing Sheets

ERROR CHECKING WEB DOCUMENTS

BACKGROUND

Error checking web documents is a process for identifying and correcting text errors in a file used for displaying a web page. In some situations, when presenting text in a web page, an author may desire to identify and correct spelling, lexicographical and grammatical errors within the text prior to posting the web page for viewing by others. For example, an author may desire to correct spelling, lexicographical and grammatical errors within a Hypertext Markup Language (HTML) document during content creation for the web page. An inability to detect mistakes in text used in web pages may confuse or mislead web page viewers. It is with respect to these and other considerations that the present invention has been made.

SUMMARY

Error checking content used in creating a web page may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

In accordance with one embodiment, a method is provided for identifying text errors within a web page by determining text to be error checked within content used in generating a web page and for determining where the text is located within the web page. The method also sends the text to an error checking module to determine whether errors exist, and displays the errors to a user which may be corrected or ignored by the user.

According to another embodiment, a system is provided for identifying text errors within a web page including memory storage and a processing unit coupled to the memory storage for determining editable text to be error checked within content used in generating a web page and removing text formatting from the editable text. The processing unit is also operative to send the editable text to an error checking module to determine whether errors exist, and to display the errors to a user which may be corrected or ignored by the user.

In accordance with yet another embodiment, a computer-readable medium is provided which stores a set of instructions which when executed performs a method for identifying text errors within a web page by determining text to be error checked within content used in generating a web page and sending the text to an error checking module. The computer-readable medium may be used to displays errors returned by the error checking module to a user which may be corrected or ignored by the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
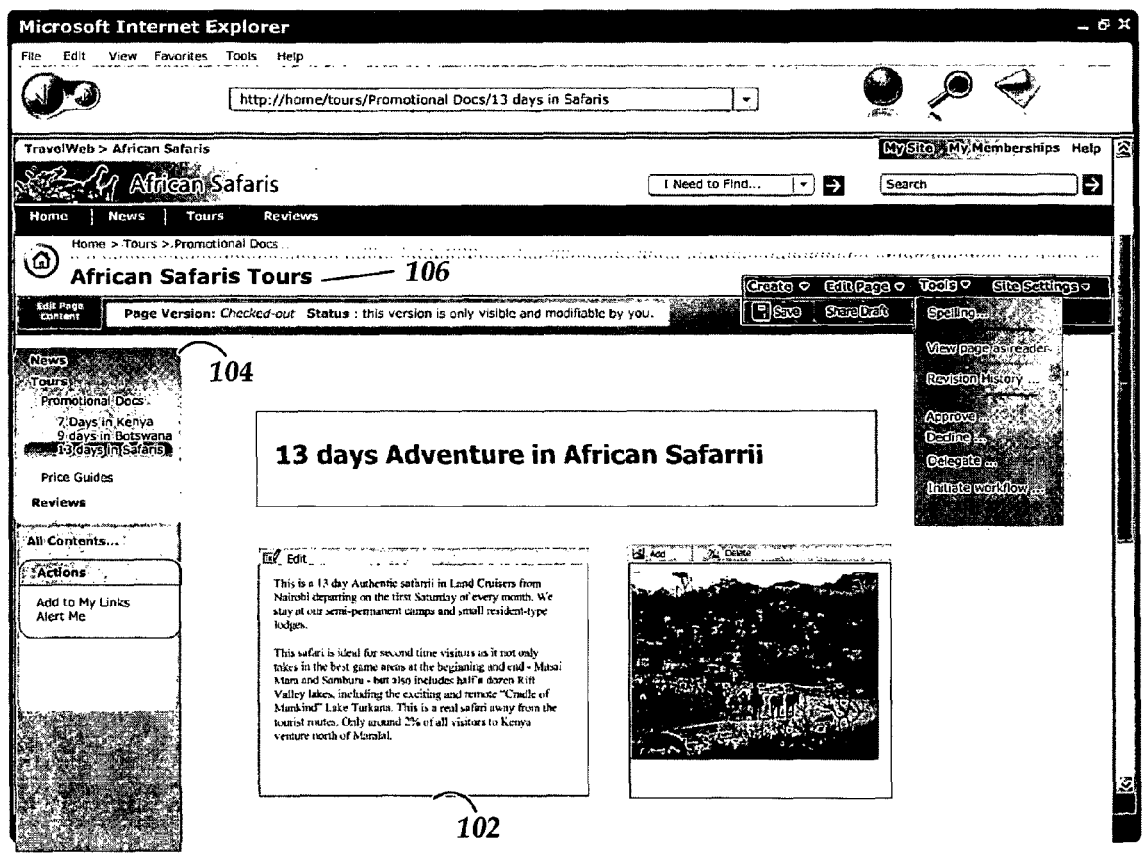
FIG. 1 is screen shot of an exemplary operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Error checking web documents may be provided. Consistent with embodiments of the present invention, a method and system for identifying and correcting errors in text utilized in creating web pages is disclosed. FIG. 1 illustrates an exemplary environment 100 for a web author during web page development. In the exemplary environment 100, the author may include various text blocks within a web page for viewing by others, for example text box 102, frame information 104 and title 106. In creating a web page, a web author may enter text within several editable fields, for example, text box 102, for subsequent display on the web page. Often when creating or editing these editable fields, the web author may improperly spell a word or use incorrect grammar. Accordingly, for quality assurance purposes, the web author may desire to error check any editable fields associated with the web page. Error checking web documents identifies spelling, lexicographical and grammatical errors in the editable fields and provides suggested corrections to any identified errors for use by the author. Thus, the web author is presented with any errors returned by an error checker along with suggested corrections to the errors and given an opportunity to accept a suggested correction, enter a user-defined correction, or ignore the error.

An embodiment consistent with the invention may include a system for error checking web documents. The system may comprise a memory storage and a processing unit coupled to the memory storage. The processing unit may be operative to determine editable text to be error checked within content used in generating a web page and remove text formatting from the editable text. The processing unit is also operative to send the editable text to an error checking module to determine whether errors exist, and display the errors to a user which may be corrected or ignored by the user.

Figure 2:
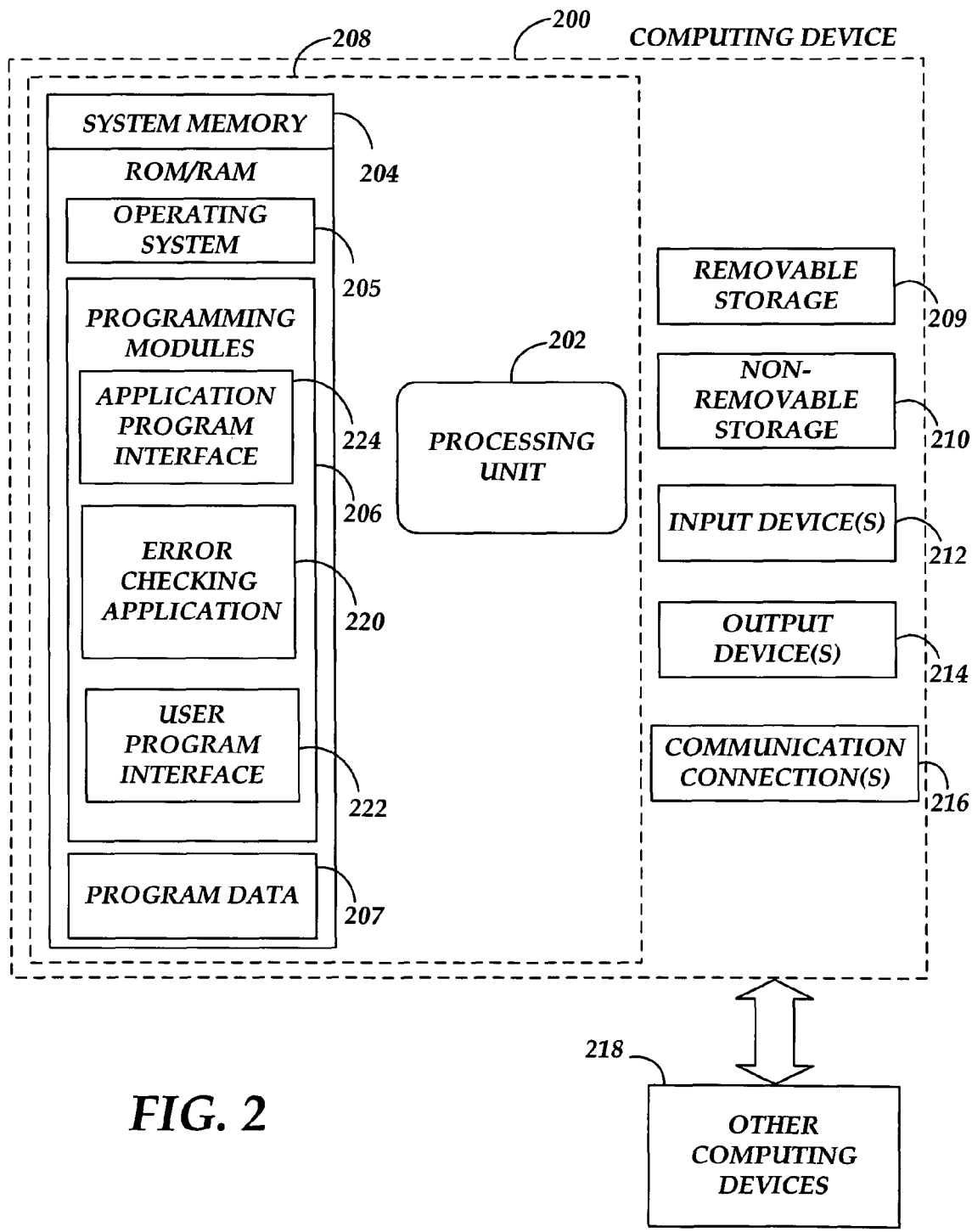
FIG. 2 is a block diagram of a system including a computing device.

FIG. 2 is a block diagram of a system including a computing device 200. Consistent with an embodiment of the invention, the aforementioned memory storage and processing unit may be implemented in a computing device, such as computing device 200 of FIG. 2. Any suitable combination of hardware, software, or firmware may be used to implement the memory storage and processing unit. For example, the memory storage and processing unit may be implemented with computing device 200 or any of the other computing devices 218, in combination with computing device 200. The aforementioned system, device, and processors are examples and other systems, devices, and processors may comprise the aforementioned memory storage and processing unit, consistent with embodiments of the invention. Furthermore, the computing device 200 may comprise an operating environment for an associated system. The system may operate in other environments and is not limited to computing device 200.

With reference to FIG. 2, a system consistent with an embodiment of the invention may include a computing device, such as computing device 200. In a basic configuration, computing device 200 may include at least one processing unit 202 and a system memory 204. Depending on the configuration and type of computing device, system memory 204 may comprise, but is not limited to, volatile (e.g. random access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include an error checking application for determining and addressing textual errors in content used for generating a web page. Programming modules 206 may further include an application program interface (API) 224 for allowing a user writing an application program to make requests of an operating system or another application, and a user program interface (UPI) 222 for transferring text, for example, packaged text which is schematized, from a client-side server (computing device 200) to a web server (other computing devices 218). Furthermore, embodiments of the invention may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 may perform processes including, for example, one or more method 300's stages as described below. The aforementioned process is an example, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
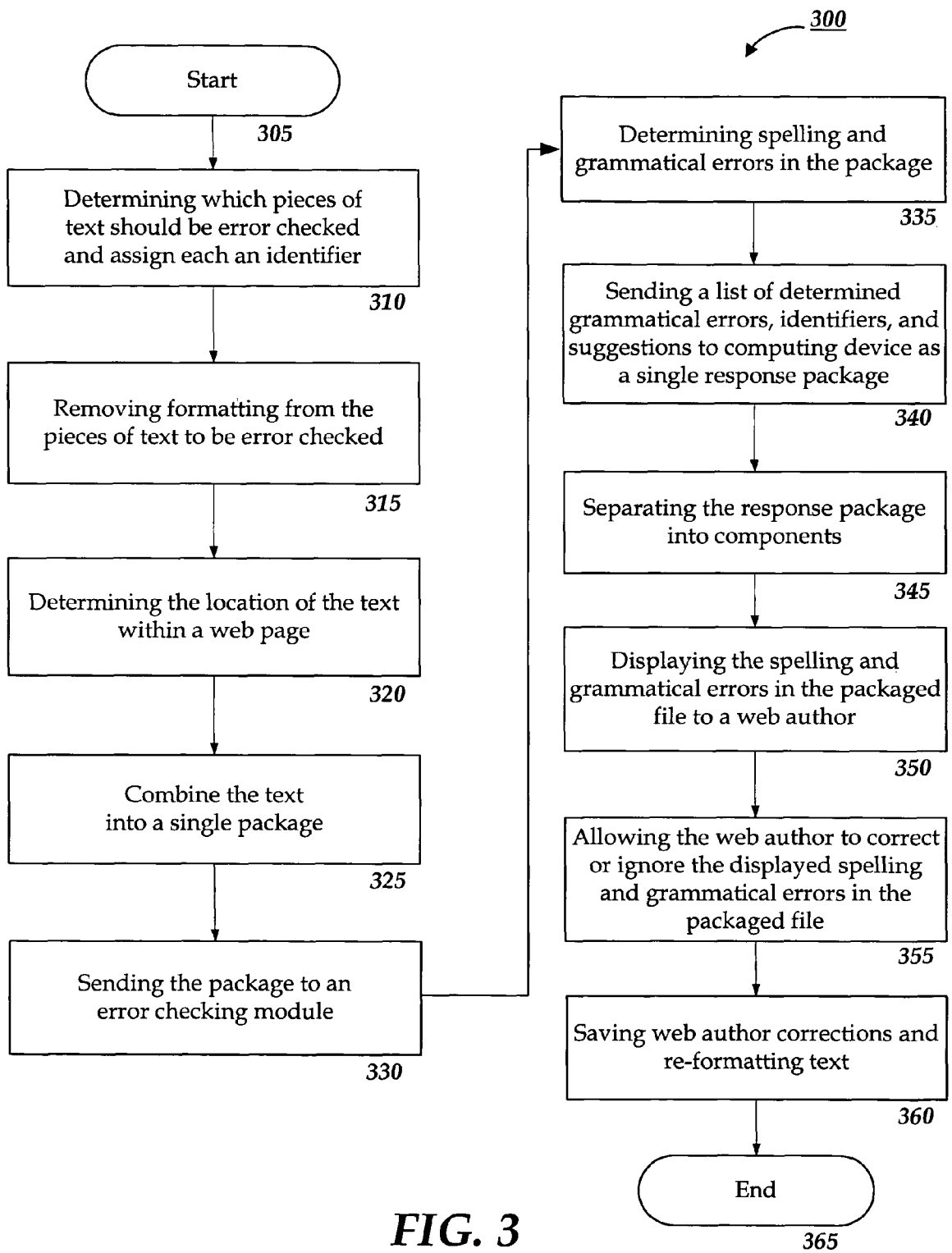
FIG. 3 is a flow chart of a method for error checking web documents.

FIG. 3 is a flow chart setting forth the general stages involved in a method 300 consistent with an embodiment of the invention for error checking web documents using system 200 of FIG. 2. Ways to implement the stages of method 300 will be described in greater detail below. Method 300 may begin at starting block 305 and proceed to stage 310 where computing device 200 may be utilized to determine which text within a web document used in generating a web page should be error checked based on, for example, an assigned attribute which is associated with the text. Accordingly, computing device 200 may identify editable text within the web page upon a request by a web author to error check text within the web page. Each piece of editable text determined to be error checked may be assigned an identifier. Some subsequent processes may choose to refer to one or more specific text pieces by the assigned identifier. Once the editable text within the web page has been determined, the method 300 proceeds to stage 315 where computing device 200 may remove any text formatting, for example, italics, from the editable text. Next, at stage 320, the computing device 200 may determine where the editable text is located within the web page. For example, a web page may include several text boxes having editable text in different locations, i.e., a web page title, web link names, frame text and text within a main section of the web page (see FIG. 1).

Next, at stage 325, the computing device 200 may combine any editable text pieces and assigned identifiers into a single package. The computing device 200 may utilize a schema, for example, an Extensible Markup Language (XML) schema, to combine the designated text into a single text package. In addition, the editable text may be separated from other editable text based on the location of the editable text within the web page using a separator, for example, a delimiter. The delimiter may be recognized as a separator by the computing device 200 and the other computing devices 218. At stage 330, the computing device 200 may send the single text package to the other computing devices 218, for example, a web server, for error checking. The computing device 200 may utilize the API 224 to facilitate the initiation of error checking by the web server. Subsequently, at stage 335, the web server may disassemble the package into discrete text pieces and associated assigned identifiers and determine spelling, lexicographical and grammatical errors. If the web server finds text considered to be erroneous, for example, misspelled text, the web server may determine suggested corrections for the misspelled text.

Upon completion of error checking by the web server, the method 300 proceeds to stage 340 where the web server may create a single response package to be sent to computing device 200. The response package may contain the assigned identifiers of the text pieces in which errors were detected along with any suggested corrections. At stage 345, the computing device 200 disassembles the single response package according to text properties prior to stage 325. Accordingly, text errors and suggested corrections sent by the web server to the computing device 200 may be associated with a particular text box in which the text originally resided at stage 320.

Figure 4:
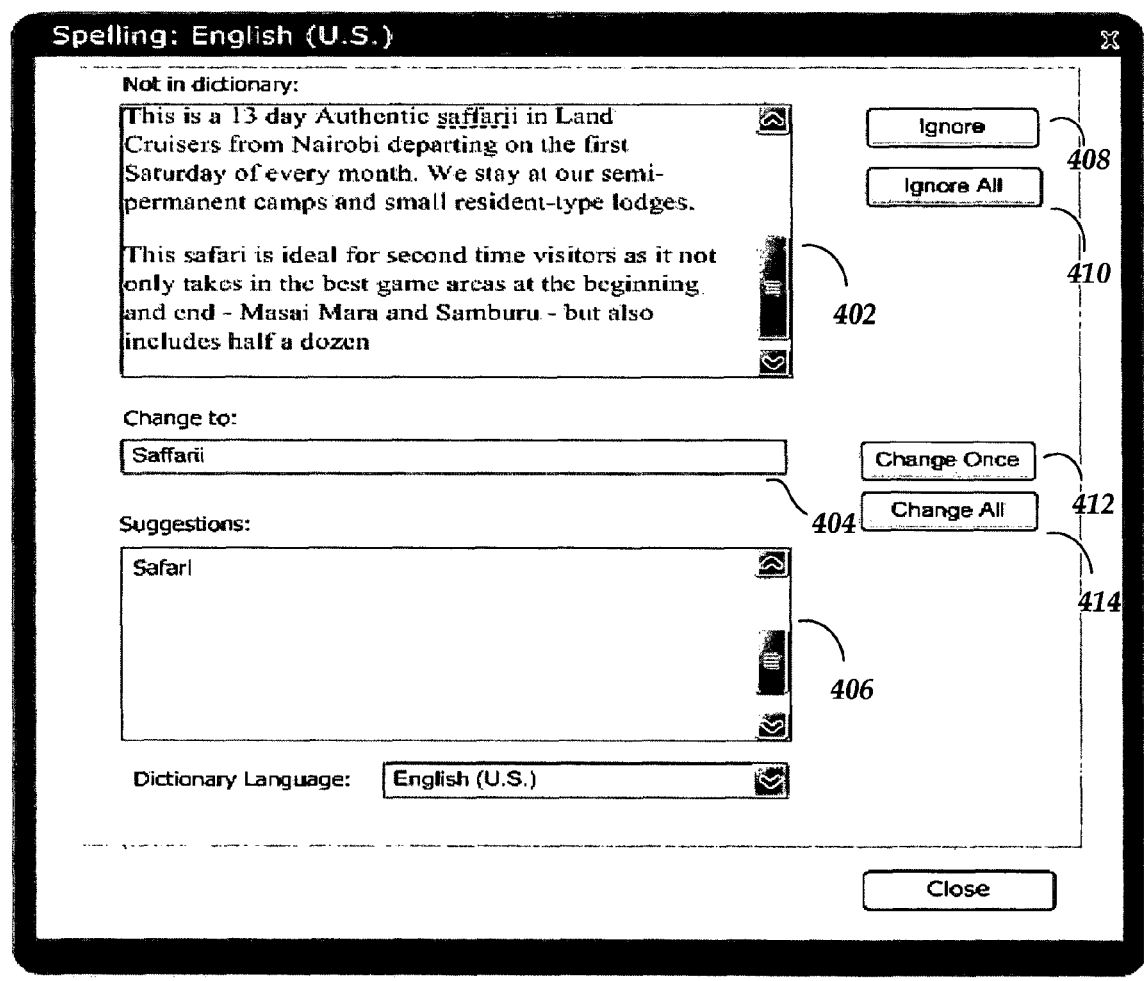
FIG. 4 is a screen shot illustrating a user interface for use with the computing device of FIG. 2.

Next, at stage 350, the computing device 200 may present the text errors to the web author using the UPI 222, which is further discussed in FIG. 4. Accordingly, at stage 355, the web author may review the text errors and suggested corrections of the text errors and may ignore the text error, accept a suggested correction to a text error or enter a user defined correction to the text error. At stage 360, the web author may save text including any error corrections in computing device 200. When the web author requests that the text be saved to the computing device 200, the computing device 200 saves the file with error corrections. In addition, the computing device 200 re-applies any text formatting removed at stage 315 for viewing by the web author. However, images, links or HTML may not correctly save error corrected text merely by saving the file. Some fields in the web page may be composite fields which are constructed using multiple components. Accordingly, when error checking images, links and HTML, a field visible to a web author and a hidden field for use by the computing device 200 and other devices 218 are utilized. Computing device 200 saves and displays the field with error corrections including the field's original formatting in a format viewable by the web author and saves a redundant copy of text as a hidden field which is utilized by the computing device 200 and the other computing devices 218. The computing device 200 associates the field in a viewable format with the hidden field using an attribute having, for example, a unique identification tag for the viewable field and a unique identification tag for the hidden field.

FIG. 4 illustrates an exemplary UPI 222 for the computing device 200, according to one embodiment. Text box 402 displays a portion of text selected for error checking by a web author when checking for errors in text that is utilized in creating web pages. Within the text box 402, a potentially misspelled word may be brought to the attention of the web author by, for example, underlining the potentially misspelled word. Additional portions of text may be included in text box 402 to allow the user to determine a context for the potentially misspelled word. When the computing device 200 determines that a potentially misspelled word exists in text box 402, the computing device 200 also displays the potentially misspelled word in text box 404. The computing device 200 may provide one or more suggested corrections for the potentially misspelled word in text box 406. However, if the web author determines that the suggested correction is not acceptable, the web author may enter his or her own correction to the potentially misspelled word in text box 404.

When the computing device 200 displays the potentially misspelled word in text box 402 and text box 404, the web author may skip the potentially misspelled word using an Ignore button 408, and may also skip the same potentially misspelled word throughout the document using an Ignore All button 410. In addition, if the web author enters a word in text box 406 to replace a misspelled word, the web author may replace a single error using a Change Once button 412, or multiple errors of the misspelled word throughout the text using a Change All button 414.

Consistent with embodiments of the present invention, the computing device 200 and the other computing devices 218 may be utilized for error checking editable text used for creating web content. The web page may utilize a variety of formats, for example, HTML, XML, Standard Generalized Markup Language (SGML) or the like. Consistent with embodiments of the present invention, the computing device 200 and the other computing devices 218 may provide a variety of error checking options, for example, page level error checking (error checking for an entire web page), error checking using a web storage system edit form, error checking HTML text within an HTML editor, or the like.

Consistent with embodiments of the present invention, error checking may be provided for a variety of text fields utilized in creating web content, for example, single line text fields, multiple line text fields, a content management server (CMS) HTML field, a CMS link field, a CMS image field, other $3^{rd}$ party fields, or the like. A field can identify client-side script functions to be used when getting or setting a field value. These associated functions may allow visible and hidden fields to be read or modified in a synchronized manner. In an exemplary embodiment, HTML attributes called GetContent and SetContent, each of which contain a name of a client function such as myFieldType_Get or myFieldType_Set, may be used when getting or setting the field value. Consistent with embodiments of the present invention, an error checking module may reside in the computing device 200, a server connected to computing device 200, or both the computing device 200 and server connected to computing device 200.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for identifying text errors within a web page, the method comprising:
   determining text for error checking within content used in generating the web page;
   determining where the text is located within the web page;
   assigning an identifier to the text;
   packaging the text into a package using a schema, wherein delimiters separate the text in the package from other text in the package based on the location of the text within the web page, the other text having an assigned identifier, wherein the text and the other text is editable text;
   sending the package to an error checking module, wherein the package is disassembled by the error checking module into discrete text pieces and associated assigned identifiers for determining errors;
   determining errors within the text;
   displaying the errors within the text to a user, wherein the user is permitted to edit the text based on the errors returned by the error checking module, wherein the text is contained within at least one of an image, a web page link, and Hypertext Markup Language (HTML); and
   saving the text with error corrections to a computing device, wherein saving the text with error corrections comprises:
      reapplying previously removed text formatting;
      saving a first field in the web page, the first field comprising a field visible to the user, the field comprising the error corrections and the previously removed text formatting, wherein the first field is associated with a first attribute having a unique identification tag; and
      saving a second field in the web page, the second field comprising a field hidden to the user, the field comprising a redundant copy of the text located within the web page for use by the computing device, wherein the second field is associated with a second attribute having a unique identification tag.

2. The method of claim 1, wherein the errors are spelling errors.

3. The method of claim 1, wherein the errors are grammatical errors.

4. The method of claim 1, further comprising disassembling a response package received from the error checking module, wherein the response package comprises the assigned identifiers of the discrete text pieces determined to contain errors.

5. A system for identifying text errors within a web page, the system comprising:
   a memory storage; and
   a processing unit coupled to the memory storage, wherein the processing unit is operative to:
      determine editable text for error checking and assigning an identifier to the editable text;
      remove text formatting from the editable text;
      package the editable text into a package using a schema, wherein delimiters separate the editable text in the package from other editable text in the package based on the location of the editable text within the web page, the other editable text having an assigned identifier;
      send the package to an error checking module, wherein the package is disassembled by the error checking module into discrete text pieces and associated assigned identifiers for determining errors;
      determine errors within the editable text received by the error checking module;

display errors within the editable text to a user, wherein the user is permitted to edit the text, wherein the editable text is contained within at least one of an image, a web page link, and Hypertext Markup Language (HTML);

reapply previously removed text formatting;

save a first field in the web page, the first field comprising a field visible to the user, the field comprising error corrections and the previously removed text formatting, wherein the first field is associated with a first attribute having a unique identification tag; and save a second field in the web page, the second field comprising a field hidden to the user, the field comprising a redundant copy of the editable text located within the web page for use by a computing device, wherein the second field is associated with a second attribute having a unique identification tag.

6. The system of claim 5, wherein the error checking module is associated with a web server.

7. The system of claim 5, wherein the error checking module is associated with a client-side server.

8. The system of claim 5, wherein the processor is further operative to disassemble a response package received from the error checking module, wherein the response package comprises the assigned identifiers of the discrete text pieces determined to contain errors.

9. A computer-readable storage medium comprising computer executable instructions which, when executed by a computer, will cause the computer to perform a method for identifying text errors within a web page, the method comprising:

determining text for error checking within content used in generating the web page;

assigning, by the computing device, an identifier to the text;

packaging, by the computing device, the text into a package using a schema, wherein delimiters separate the text in the package from other text in the package based on the location of the text within the web page, the other text having an assigned identifier, wherein the text and the other text is editable text;

sending the package to an error checking module, wherein the package is disassembled by the error checking module into discrete text pieces and associated assigned identifiers for determining errors;

determining errors within the text;

displaying the errors within the text to a user, wherein the user is permitted to edit the text, wherein the text is contained within at least one of an image, a web page link, and Hypertext Markup Language (HTML); and saving the text with error corrections to a computing device, wherein saving the text with error corrections comprises:

reapplying previously removed text formatting;

saving a first field in the web page, the first field comprising a field visible to the user, the field comprising the error corrections and the previously removed text formatting, wherein the first field is associated with a first attribute having a unique identification tag; and saving a second field in the web page, the second field comprising a field hidden to the user, the field comprising a redundant copy of the text located within the web page for use by the computing device, wherein the second field is associated with a second attribute having a unique identification tag.

10. The computer-readable storage medium of claim 9, wherein the web page is formatted in at least one of the following formats: plain text, HTML, XML and SGML.

11. The computer-readable storage medium of claim 9, wherein the user can review each error and replace the error with a correction suggested by the error checking module.

12. The computer-readable storage medium of claim 9, wherein the user can review each error and replace the error with user-specified text.

13. The computer-readable medium of claim 9, further comprising disassembling a response package received from the error checking module, wherein the response package comprises the assigned identifiers of the discrete text pieces determined to contain errors.

\* \* \* \* \*